United States Patent Office 3,585,025
Patented June 15, 1971

3,585,025
BASIC AGGREGATE FOR THE PRODUCTION OF STEEL
Karl-Heinz Obst, Wulfrath, Jurgen Stradtmann, Remscheid, and Kurt Benczek, Dusseldorf, Germany, assignors to Rheinische Kalksteinwerke GmbH, Wulfrath, Germany
No Drawing. Filed July 29, 1968, Ser. No. 748,202
Claims priority, application Germany, July 27, 1967, P 15 83 281.2
Int. Cl. C21c 5/28, 7/00
U.S. Cl. 75—54          9 Claims

ABSTRACT OF THE DISCLOSURE

Pellets or briquettes of lime containing a substance which will cause the disintegration of the pellets or briquettes at temperatures about that of liquid pig iron improve slag formation and overcome problems heretofore encountered in the production of steel.

---

The present invention relates to a raw material for use in producing steel and more particularly to a ground lime which is subsequently briquetted or pelletized.

The production and purification of steel by conventional processes, such as the modern oxygen blowing processes, requires the use of basic aggregates, especially lime, for the formation of slags. These aggregates must be available in sufficient quantity for the spontaneous formation of slag during the blowing and, therefore, numerous experiments have been conducted using the continuous introduction of lime in a finely distributed or pulverized form. These experiments have been unsatisfactory because of the difficulties encountered in introducing the proper amount of lime and the poor distribution of the fine lime which occurs because of the high temperatures in the converter causing sintering of the particles. This phenomenon has also been observed when pieces or lumps of lime are added and the conglomerates are poor materials for the formation of good slags. Problems have also been encountered, among other things, with the discharge of powdered lime during puddling, and attempts to add the lime in the form of briquettes or pellets have not been satisfactory. During these experiments, an inactivation as a result of sintering occurred in a similar manner as to that found with the use of lump lime and the formation of slag is too slow.

A highly reactive lime which can be well dosed and which can be added also during the blowing process is required for an automatization of steel production. The lime must retain its high reactivity for the formation of slags and not be lost as a dust during the blowing operation. The present invention solves these problems heretofore encountered. We have discovered that ground, and subsequently briquetted or pelletized lime, can be used advantageously as a basic aggregate in the production of steel if the briquettes or pellets contain substances which bring about a disintegration of the briquettes or pellets at a temperature about that of liquid pig iron.

Among the substances which bring about this decomposition of the pellets, compositions which decompose into gases at the temperatures of the liquid iron are preferred. The development of gas in the pellets leads to a spontaneous decomposition of the compressed bodies into a finely structured lime which is highly reactive and which rapidly forms slags. However, the decomposition of the pellets can also be accomplished by substances which undergo an increase in volume at elevated temperatures, such as vermiculite.

The substances which bring about the development of gas can be separated into two groups which are inorganic substances which release a gas when heated, such as, carbonates of the earth alkaline metals, alkali carbonates and their bicarbonates, and as the second group, organic substances, which decompose developing a gas during their decompositions or combustion.

Carbon dioxide producers suitable for practicing the present invention include sodium carbonate, sodium bicarbonate, calcium carbonate, naturally occurring carbonates, such as limestone, dolomite and magnesites. Other inorganic gas producers include calcium carbide, calcium hydride, barium carbide and barium hydride.

Suitable organic gas producers for practicing the present invention include tar, pitch, bitumina, vegetable and mineral oils, sawdust, finely ground coal, coke dross, natural resins and combustible synthetic resins.

The gas producing materials are usually added in amounts of up to about 25% by weight in a finely comminuted form in order that they be completely and evenly dispersed throughout the pellets or briquettes. The mixtures can also be formed by simultaneously comminuting the components to a fine powder and then compacting the same.

Combinations of the inorganic and organic gas producing materials are also effective because the combustion of the organic materials replace some or all of the heat consumed by the decomposition of the carbon dioxide producers. Also, it is frequently desirable to combine other desirable slag components, such as, powdered iron oxides, powdered aluminum oxides, powdered calcium fluorides and the like with the lime in order to gain a simultaneous and even distribution of all the desired components.

The pellets or briquettes can be formed from the mixture of lime and gas producing material, and if desired, other additives by conventional methods such as compression molding. Pressures in excess of 300 kg./cm.$^2$ are usually used unless a binder, such as the natural and synthetic resins are used as part or all of the gas producing material. These binders are desirable because they produce sufficient gas to disintegrate and disperse the lime as well as reduce molding pressures to a minimum. Suitable resins for binders include shellac, polyvinyl chloride, nylon, copolymers of vinyl chloride and vinyl acetate and polystyrene. These may be used as a part of or all of the gas producer.

The following examples are presented to further illustrate the present invention and in all occurrences, parts are by weight.

EXAMPLE 1

85 parts of finely ground lime is thoroughly mixed with 15 parts calcium carbonate until a uniform dispersion is obtained. This mixture is then compressed in a conventional briquetting mold to under a pressure of 1000 kg./cm.$^2$. The resulting briquettes are introduced into puddles of liquid iron or steel to rapidly produce good slags.

EXAMPLE 2

80 parts of finely ground lime, 15 parts of finely ground dolomite and 5 parts pitch are thoroughly blended until an even dispersion is obtained. This mixture is then compressed in a conventional pellet mold at a pressure of about 150 kg./gm. These pellets are introduced into the liquid steel during the blowing operation and rapidly form a good slag with negligible dust.

We claim:
1. A compressed composition for forming slag during the manufacture of steel consisting of at least 75 weight percent lime and a material capable of disintegrating said compressed composition at a temperature of about that of liquid pig iron.
2. The composition of claim 1 wherein said material forms a gas at the temperature of liquid pig iron.

3. The composition of claim 1 wherein said material is selected from the group consisting of alkali metal carbonates, alkaline earth carbonates, alkali metal bicarbonates, alkaline earth bicarbonates, alkali metal hydrides, alkaline earth hydrides and mixtures thereof.

4. The composition of claim 3 wherein said material is calcium carbonate.

5. The composition of claim 1 wherein said composition is compressed in a form selected from the group consisting of pellets and briquettes.

6. The composition of claim 5 wherein said material contains calcium carbonate.

7. The composition of claim 6 wherein said material contains pitch.

8. A compressed composition according to claim 6 consisting of about 85% lime and about 15% limestone.

9. A compressed composition according to claim 7 consisting of about 80% lime, 15% dolomite and 5% pitch.

References Cited

UNITED STATES PATENTS 3,374,085   3/1968   Stone _____ 75—3

L. DEWAYNE RUTLEDGE, Primary Examiner

J. E. LEGRU, Assistant Examiner

U.S. Cl. X.R.

75—3, 25, 53, 58